United States Patent
Lee et al.

(10) Patent No.: US 12,537,004 B2
(45) Date of Patent: Jan. 27, 2026

(54) VOICE RECOGNITION DEVICE HAVING BARGE-IN FUNCTION AND METHOD THEREOF

(71) Applicant: ELECTRONICS AND TELECOMMUNICATIONS RESEARCH INSTITUTE, Daejeon (KR)

(72) Inventors: Min Kyu Lee, Daejeon (KR); Seung Hi Kim, Daejeon (KR); Sanghun Kim, Daejeon (KR); Jeonguk Bang, Daejeon (KR); Seung Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 203 days.

(21) Appl. No.: 18/498,241

(22) Filed: Oct. 31, 2023

(65) Prior Publication Data

US 2024/0212681 A1 Jun. 27, 2024

(30) Foreign Application Priority Data

Dec. 22, 2022 (KR) .......... 10-2022-0181321

(51) Int. Cl.
*G10L 17/00* (2013.01)
*G06V 40/16* (2022.01)
(Continued)

(52) U.S. Cl.
CPC ............ *G10L 15/22* (2013.01); *G06V 40/172* (2022.01); *G10L 13/02* (2013.01); *G10L 17/00* (2013.01); *H04N 23/611* (2023.01)

(58) Field of Classification Search
CPC ......... G10L 15/22; G10L 13/02; G10L 17/00; G10L 17/22; G10L 17/02; G10L 25/51;
(Continued)

(56) References Cited

U.S. PATENT DOCUMENTS 6,330,539 B1 * 12/2001 Takayama .......... G10L 15/1822
  704/251
11,133,008 B2   9/2021 Piernot et al.
(Continued)

FOREIGN PATENT DOCUMENTS

CN    103576839 A  *  2/2014
CN    110265009 A  *  9/2019   ............ G10L 15/22
(Continued)

OTHER PUBLICATIONS

Ruijie Tao et al., "Is Someone Speaking? Exploring Long-term Temporal Features for Audio-visual Active Speaker Detection", Department of Electrical and Computer Engineering, National University of Singapore, Singapore, arXiv:2107.06592v2 [eess.AS] Jul. 25, 2021.
(Continued)

*Primary Examiner* — Abul K Azad
(74) *Attorney, Agent, or Firm* — LRK PATENT LAW FIRM

(57) ABSTRACT

A voice recognition device having a barge-in function and a method thereof are proposed. In an exemplary embodiment, there are disclosed an intelligent robot and a method for operating the intelligent robot, including an input unit for receiving a user's voice data, one or more processors, and an output unit for outputting a response generated on a basis of the user's voice data, wherein the processors generate the response corresponding to the users' voice data while maintaining a listening mode for identifying a dialogue partner by using the user's face image data and the user's voice data, and perform a speaking mode for control so as to perform an operation corresponding to the response.

8 Claims, 5 Drawing Sheets

(51) Int. Cl.
*G10L 13/02* (2013.01)
*G10L 15/22* (2006.01)
*H04N 23/611* (2023.01)

(58) Field of Classification Search
CPC ........ G10L 2015/223; G10L 2015/225; G06V 40/172; G06V 40/161; G06V 40/167; H04N 23/611; B25J 19/026; G06T 7/11
See application file for complete search history.

(56) References Cited

U.S. PATENT DOCUMENTS

| | | |
|---|---|---|
| 2018/0075023 A1 | 3/2018 | Kim et al. |
| 2019/0164541 A1 | 5/2019 | Kim et al. |
| 2021/0151043 A1 | 5/2021 | Lee et al. |

FOREIGN PATENT DOCUMENTS

| | | | | |
|---|---|---|---|---|
| CN | 112472538 A | * | 3/2021 | ........... G06V 40/161 |
| CN | 110460971 B | * | 3/2023 | .............. H04W 4/38 |
| KR | 10-1195870 B1 | | 10/2012 | |
| KR | 10-1961341 B1 | | 3/2019 | |
| KR | 10-2021-0061115 A | | 5/2021 | |

OTHER PUBLICATIONS

Bowen Shi et al., "Robust Self-Supervised Audio-Visual Speech Recognition", Toyota Technological Institute at Chicago Meta AI, arXiv:2201.01763v3 [cs.SD] Jul. 14, 2022.

* cited by examiner

VOICE RECOGNITION DEVICE HAVING BARGE-IN FUNCTION AND METHOD THEREOF

CROSS REFERENCE TO RELATED APPLICATION

The present application claims priority to Korean Patent Application No. 10-2022-0181321, filed Dec. 22, 2022, the entire contents of which is incorporated herein for all purposes by this reference.

BACKGROUND OF THE INVENTION

1. Field of the Invention

The present disclosure relates to a device and method capable of recognizing a user's barge-in voice while an intelligent robot is playing back a response sound.

More particularly, the present disclosure relates to a voice recognition device and a method capable of increasing performance through robustly detecting a voice section and robustly recognizing a voice, against a barge-in voice, by utilizing a user's multimodal (i.e., vision and audio) information within a range of vision through a camera corresponding to the eyes of an intelligent robot.

2. Description of Related Art

With the development of artificial intelligence technology, intelligent robots like humans are widely becoming available. In particular, recently, the performance of intelligent robot technologies for understanding a user's voice data when the user's voice data is input and providing an appropriate answer based on a large-capacity pre-learning model has been greatly improved.

However, there are many difficulties in the process of using the intelligent robots. Among them, particularly, a technology to detect accurately a barge-in situation where a user interrupts a dialogue while a robot has already been responding and to recognize immediately the user's voice corresponds to a difficult technology.

In an actual interrupt (hereinafter, referred to as barge-in) situation, multiple simultaneous noises exist such as various types of environmental noise and voice noise as well as voice noise played back by a robot. This is a major factor that deteriorates the performance of detecting a user's voice section and recognizing a voice in a situation where the user barges in. In order to solve such a problem, technologies for forcing a barge-in voice not to be input by blocking a microphone input to prevent a barge-in while a robot's voice is played back or technologies for eliminating playback sound by using signal processing technology are being used.

However, the forcing of the barge-in not to occur by blocking the microphone input causes inconvenience to the user by providing a user experience different from an actual dialogue, and the technology and the like for using playback sound to utilize the acoustic signal processing for loopback signals have limitations in their performance.

SUMMARY OF THE INVENTION

An objective of the present disclosure is to provide a voice recognition method and system for an intelligent robot, wherein a function of natural dialogue between a user and the intelligent robot is provided, and even in a case where a barge-in of the user's voice occurs during the intelligent robot's utterance, the intelligent robot responds immediately and naturally like a human to the user's barge-in utterance by utilizing multimodal (i.e., image and voice) information.

According to an exemplary embodiment of the present disclosure, there is provided an intelligent robot, including: an input unit for receiving a user's voice data; one or more processors; and an output unit for outputting a response generated on a basis of the user's voice data, wherein the processors may generate the response corresponding to the users' voice data while maintaining a listening mode for identifying a dialogue partner by using the user's face image data and the user's voice data, and perform a speaking mode for control so as to perform an operation corresponding to the response.

In addition, the processors may detect the user's face within a range of vision by using surround image data obtained through the input unit, receive the voice data corresponding to the user's face, and identify the dialogue partner by using a learned artificial intelligence model to determine similarity between previously learned data and the user's face data and user's voice data.

In addition, the processors may control a camera provided in the input unit when the dialogue partner's voice is detected and adjust a field of view input to the camera so as to center the dialogue partner's face.

In addition, the processors may detect the user's face area from the user's pre-stored face data and image data input through the camera, and determine that adjusting the field of view of the intelligent robot is completed when the user's detected face area is positioned in a center of the field of view of the camera in a case where the similarity between the user's detected face area and the user's pre-stored face data exceeds a predetermined value.

In addition, the processors may determine whether to ask back or not on a basis of a voice recognition result of the user's voice data, and the voice recognition result may refer to voice recognition confidence of the user's voice data.

In addition, there is provided a method for operating an intelligent robot, the method including: receiving a user's face image data and the user's voice data; performing a listening mode for identifying a dialogue partner by using the user's face image data and the user's voice data; generating a response corresponding to the user's voice data while maintaining the listening mode; and performing a speaking mode for control so as to perform an operation corresponding to the response.

In addition, the performing of the listening mode may include: using surround image data obtained through an input unit to detect the user's face within a range of vision and receiving the voice data corresponding to the user's face; and identifying the dialogue partner by using a learned artificial intelligence model to determine similarity between previously learned data and the user's face data and user's voice data.

In addition, the performing of the listening mode may include controlling a camera provided in the input unit when the dialogue partner's voice is detected and adjusting a field of view input to the camera so as to center the dialogue partner's face.

In addition, the performing of the listening mode may include detecting the user's face area from the user's pre-stored face data and image data input through the camera and determining that adjusting the field of view of the intelligent robot is completed when the user's detected face area is positioned in a center of the field of view of the camera in a case where the similarity between the user's detected face area and the user's pre-stored face data exceeds a predetermined value.

In addition, the performing of the speaking mode may include determining whether to ask back or not on a basis of a voice recognition result of the user's voice data, and the voice recognition result may refer to voice recognition confidence of the user's voice data.

According to the present disclosure, unlike a conventional method of a voice-based intelligent robot, there is an effect that an intelligent robot may respond quickly and robustly to a user's sudden barge-in utterance to stop the utterance and switch to a listening mode, thereby allowing a dialogue to continue naturally.

In addition, according to the present disclosure, there is an effect that a user's original sound may be robustly recognized in an utterance overlap section between an intelligent robot and the user by utilizing visual information together, so the user's voice is accurately recognized in the utterance overlap section as well as in a high-noise environment, thereby allowing a dialogue to be carried on effectively.

In addition, according to the present disclosure, there is an effect that even though voice recognition fails, asking back at a correct time is performed by utilizing visual information together with a voice recognition method of a conventional intelligent robot, thereby providing a natural dialogue scenario.

DETAILED DESCRIPTION OF THE INVENTION

Figure 1:
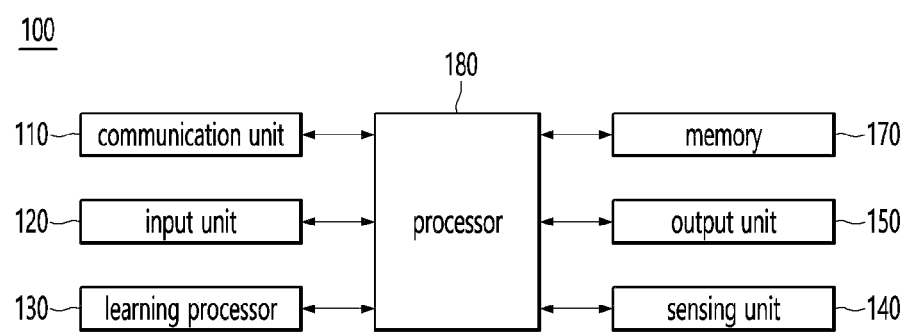
FIG. 1 is a view illustrating a voice recognition device 100 according to an exemplary embodiment of the present disclosure.

In the technology described below, various modifications may be made and various exemplary embodiments may be provided, so particular exemplary embodiments will be illustrated in the drawings and described in detail. However, this is not intended to limit the technology described below to the particular embodiments. On the contrary, the present disclosure is to be understood to include all various alternatives, equivalents, and substitutes that may be included within the spirit and technical scope of the technology described below.

Throughout the specification, when a part is said to be "connected" to another part, an expression such as "connected" is intended to include not only "directly connected" but also "electrically connected", while having a different element in the middle thereof.

Terms such as first, second, A, B, etc. may be used to describe various components, but the corresponding components are not limited by the terms, and are used only for the purpose of distinguishing merely one component from another component. For example, without departing from the scope of the technology described below, a first component may be referred to as a second component, and similarly, the second component may be referred to as the first component. The term "and/or" includes a combination of a plurality of related and described items or any of the plurality of related and described items.

In the terms used in the present specification, singular expressions should be understood to include plural expressions unless the context clearly interprets otherwise. It should be understood that the terms such as "includes", "comprises", and the like mean that the described feature, number, step, operation, component, part, or combination thereof exists, but do not preclude possibilities of the presence or addition of one or more other features, numbers, steps, operations, components, parts, or combinations thereof.

Prior to a detailed description of the drawings, it should be clarified that the classification of components in the present specification is merely a classification for each main function of each corresponding component. That is, it may be provided such that two or more components described below may be combined into one component, or one component may be divided into two or more components for each more subdivided function. Further, in addition to its corresponding main functions, each component to be described below may additionally perform some or all of the functions of other components, and naturally, some of the corresponding main functions of each component may also be exclusively performed by other designated components.

In addition, in performing a method or method of operation, each process constituting the method may be performed in an order different from a specified order unless a specific order is clearly described in context. That is, each process may be performed in the same order as specified, may be performed substantially simultaneously, or may be performed in a reverse order.

Hereinafter, it will be described that a voice recognition device 100 having a barge-in function performs the following operations. The voice recognition device 100 is a device for processing input data consistently and performing calculations required for voice recognition according to a particular model or algorithm. For example, the voice recognition device may be a computing device, and the computing device may be implemented in the form of a PC, a server on a network, a smart device, or a chipset with an embedded design program.

FIG. 1 is a view illustrating a voice recognition device 100 according to an exemplary embodiment of the present disclosure.

FIG. 1 shows a block diagram of a computing device for providing a voice recognition function related to the exemplary embodiment of the present disclosure. The components of the computing device 100 for providing the voice recognition function shown in FIG. 1 are exemplary. Merely some of the components shown in FIG. 1 may also constitute a computing device 100 for providing the voice recognition function, and additional components other than the components shown in FIG. 1 may also be included in the computing device 100 that provides realistic visualization.

FIG. 1 is the view illustrating the voice recognition device 100 according to the exemplary embodiment of the present disclosure.

The voice recognition device 100 may be implemented as a fixed device or movable device, such as a TV, a projector, a mobile phone, a smartphone, a desktop computer, a laptop, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a desktop computer, a digital signage, a robot, a vehicle, etc.

Referring to FIG. 1, the voice recognition device 100 may include a communication unit 110, an input unit 120, a learning processor 130, a sensing unit 140, an output unit 150, a memory 170, a processor 180, and the like.

The communication unit 110 may transmit and receive data to and from external devices such as other devices or servers by using wired or wireless communication technology. For example, the communication unit 110 may transmit and receive sensor information, user input, learning models, control signals, etc. with the external devices.

In this case, the communication technologies used by the communication unit 110 include Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), etc.

The input unit 120 may obtain various types of data.

In this case, the input unit 120 may include a camera for inputting image signals, a microphone for receiving audio signals, a user input unit for receiving input of information from a user, etc. Here, by regarding the camera or microphone as a sensor, signals obtained from the camera or microphone may be referred to as sensing data or sensor information.

The input unit 120 may obtain: training data for model learning; input data to be used when an output is obtained by using a learning model; and other data. The input unit 120 may obtain unprocessed input data, and in this case, the processor 180 or the learning processor 130 may extract input features by preprocessing the input data.

The learning processor 130 may allow a model composed of an artificial neural network to be learned by using the training data. Here, the learned artificial neural network may be referred to as the learning model. The learned artificial neural network model may be used to infer result values for new input data other than the training data, and the inferred result values may be used as a basis of determination for performing a certain operation. The neural network model according to the exemplary embodiment of the present disclosure may be learned through the learning processor 130.

In this case, the learning processor 130 may include a memory integrated or implemented in the voice recognition device 100. Alternatively, the learning processor 130 may also be implemented by using a memory 170, an external memory directly coupled to the voice recognition device 100, or a memory maintained in an external device.

The sensing unit 140 may use various sensors to obtain at least one piece of information from among internal information of the voice recognition device 100, information about a surrounding environment of the voice recognition device 100, and user information.

In this case, the sensors included in the sensing unit 140 include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, and a microphone, a LIDAR, a radar, etc.

The output unit 150 may generate an output related to the senses of vision, hearing, touch, or the like.

In this case, the output unit 150 may include a display unit for outputting visual information, a speaker for outputting auditory information, a haptic module for outputting tactile information, etc.

The memory 170 may store data for supporting various functions of the voice recognition device 100. For example, the memory 170 may store input data, learning data, learning models, learning history, etc., which are obtained from the input unit 120.

The processor 180 may determine at least one or more executable operations of the voice recognition device 100 on the basis of information determined or generated by using a data analysis algorithm or a machine learning algorithm. In addition, the processor 180 may control the components of the voice recognition device 100 to perform the determined operations.

To this end, the processor 180 may request, retrieve, receive, or utilize data from the learning processor 130 or the memory 170, and may control the components of the voice recognition device 100 so as to execute a predicted operation or an operation determined to be desirable from among the at least one or more executable operations.

In this case, when linkage with an external device is required to perform a determined operation, the processor 180 may generate a control signal to control the corresponding external device and transmit the generated control signal to the corresponding external device.

The processor 180 may obtain intent information for a user input, and may determine a user request on the basis of the obtained intent information.

In this case, the processor 180 may obtain the intent information corresponding to the user input by using at least one or more of a speech to text (STT) engine for converting a voice input into a string and a natural language processing (NLP) engine for obtaining intent information of natural language.

In this case, the at least one or more of the STT engine and the NLP engine may be configured, at least in part, with an artificial neural network learned according to a machine learning algorithm. In addition, the at least one or more of the STT engine and the NLP engine may be learned by the learning processor 130, the server 200, or the distributed processing thereof.

The processor 180 may collect history information including the content of operations of the voice recognition device 100 or a user's feedback on the operations, so as to store the history information in the memory 170 or the learning processor 130, or to transmit the history information to an external device such as the server 200, etc. The collected history information may be used to update the learning model.

The processor 180 may control at least some of the components of the voice recognition device 100 to run an application program stored in the memory 170. Furthermore, the processor 180 may operate two or more of the components included in the voice recognition device 100 in combination with each other in order to run the application program.

Hereinafter, the voice recognition device of the present disclosure will be described in detail.

The voice recognition device according to the exemplary embodiment of the present disclosure relates to some functions mounted on an intelligent robot or provided by the intelligent robot. Accordingly, the following intelligent robot should be interpreted as including the voice recognition device.

In general, an intelligent robot recognizes a voice by using solely voice information of a user, and operates in a way of providing the user with an appropriate answer (i.e., a response) in response to the recognized user's voice, or in a way of showing the response to the user through an action.

Conventionally, the intelligent robot that operates through voice recognition receives a user's voice, and in a case of initiating an answer or an action in response to the received user's voice, the intelligent robot blocks an input of an input unit where the user's voice signal is received.

Accordingly, in a case where the user's voice (i.e., a barge-in voice) is received at a time when a particular operation of the intelligent robot equipped with a voice recognition function is performed, a user's utterance is unable to be received.

This is because a listening mode and a speaking mode are present separately in an operation algorithm of the existing intelligent robot.

Hereinafter, the present disclosure proposes an intelligent robot system and method, wherein inputs of a voice of a user present within a range of vision of the robot along with an image are received by utilizing a multimodal technology for utilizing image information and audio information together, thereby providing a barge-in function regardless of a voice of the intelligent robot and surrounding noise.

Figure 2:
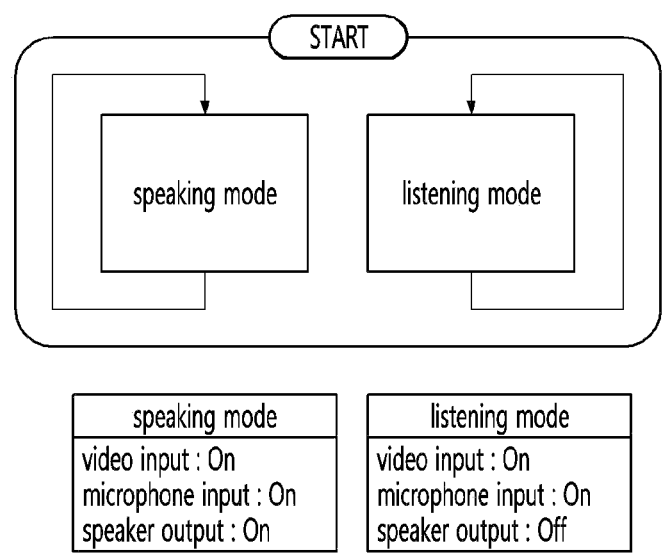
FIG. 2 is a view illustrating a speaking mode and a listening mode according to the exemplary embodiment of the present disclosure.

FIG. 2 is a view illustrating an operation of the voice recognition device having the barge-in function according to the exemplary embodiment of the present disclosure.

Referring to FIG. 2, the intelligent robot 100 according to the exemplary embodiment of the present disclosure may perform the operations of a "listening mode" to listen to a user's voice and a "speaking mode" to respond to a recognized voice.

Specifically, in the "listening mode", a user's voice may be received through a microphone provided in the input unit 120. In addition, the intelligent robot may obtain surround image data through a camera provided in the input unit 120, and may perform object recognition, user identification, and utterer recognition by using the obtained image data.

In the "listening mode", the intelligent robot may better receive voice data received from the outside by turning off a speaker provided in the output unit 150.

In addition, in the "speaking mode", the user's voice data and user image data may be received through the microphone, the camera, etc., which are provided in the input unit 120, and may perform a response or an operation, which is corresponding to the user's voice received by turning on the speaker provided in the output unit 150.

In the intelligent robot according to the exemplary embodiment of the present disclosure, both the "listening mode" and "speaking mode" may always be operated at the same time.

That is, the intelligent robot according to the exemplary embodiment of the present disclosure may continuously receive the user's voices through the input unit 120 as the "listening mode" is always activated. In this way, while performing a particular operation, the intelligent robot will be able to respond to a barge-in of the user's voice.

Figure 3:
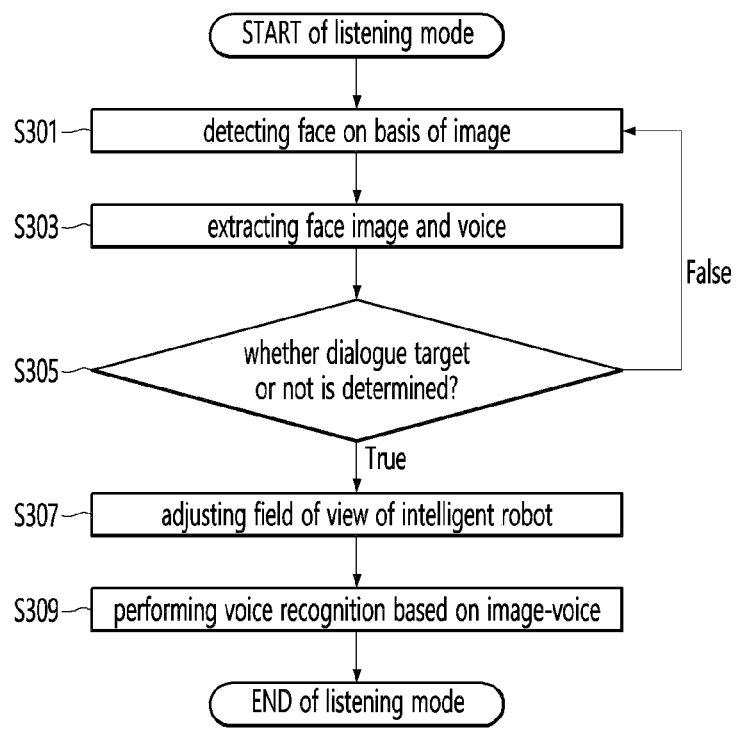
FIG. 3 is view illustrating a flowchart of the listening mode according to the exemplary embodiment of the present disclosure.

FIG. 3 is a flowchart describing an operation of a "listening mode" according to the exemplary embodiment of the present disclosure.

Referring to FIG. 3, the operation of an intelligent robot in the "listening mode" is described. When the "listening mode" starts, a processor 180 of the intelligent robot 100 may receive image data and voice data of a surrounding present within a range of vision of the intelligent robot by using an input unit 120.

In step S301, the intelligent robot may detect a user's face present within the range of vision of the intelligent robot on the basis of the surround image data received through a camera of the input unit 120.

Thereafter, in step S303, the intelligent robot 100 according to the exemplary embodiment of the present disclosure may extract the user's detected face and voice data input from a microphone.

In step S305, the intelligent robot 100 may identify a dialogue partner by using the user's face image data and the user's input voice data. Specifically, by using a pre-learned artificial intelligence model, the intelligent robot may identify the user by checking synchronization of the user's face data and voice data and determining similarity between previously learned data and the user's face data and voice data.

In this case, the identified user may be named as a "dialogue target".

The artificial intelligence model may include an artificial neural network model that outputs user identification information when at least one piece of the user's face data and voice data is input. In an example of the neural network model, a conventionally disclosed model is used.

In this case, a technology for checking the synchronization of voice data may not only use the artificial intelligence model, but also use various conventionally disclosed technologies.

According to the exemplary embodiment of the present disclosure, in step S307, when a voice of a dialogue partner is detected, the intelligent robot 100 may control the camera provided in the input unit 120 and adjust a field of view of the intelligent robot so as to center the dialogue partner's face.

Specifically, the processor 180 of the intelligent robot may detect a user's face area from the user's pre-stored face data and the image data input through the camera, and in a case where similarity between the user's detected face area and the user's pre-stored face data exceeds a predetermined value, it may be determined that adjusting the field of view of the intelligent robot is completed when the user's detected face area is positioned in the center of the field of view of the camera. In addition, in a case where the user's detected face area is positioned in the center on the basis of horizontal and vertical resolution of the camera, it may be determined that adjusting the field of view is completed.

In step S309, the intelligent robot according to the exemplary embodiment of the present disclosure may perform voice recognition based on the voice data received at the same time as the adjusting of the field of view. A voice recognition result obtained in the listening mode may be transmitted to the "speaking mode."

In the listening mode, since the voice data of the user who is specified (i.e., identified) as the dialogue partner is solely received on the basis of the surround image data and the user's voice data, voice recognition may be performed by distinguishing it from surrounding noise or other users' utterance data.

Since the "listening mode" is always activated, the embodiment of the present disclosure will be able to respond to even the user's barge-in voice when the user's voice is uttered while the intelligent robot is performing an arbitrary operation through the above described process.

An operation of the intelligent robot in a "speaking mode" will be described below.

Figure 4:
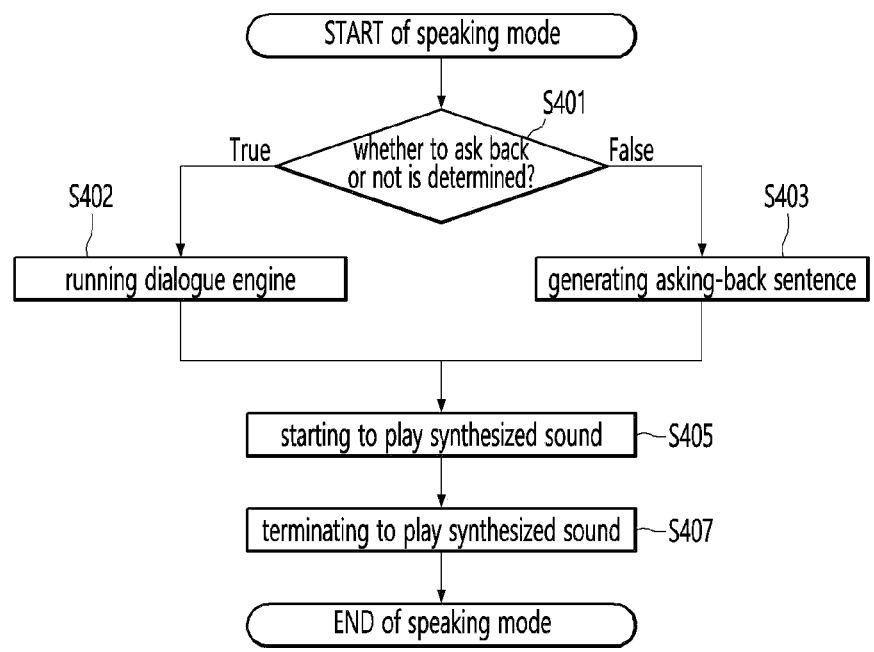
FIG. 4 is a view illustrating a flowchart of the speaking mode according to the exemplary embodiment of the present disclosure.

FIG. 4 is a flowchart illustrating the operation of the "speaking mode" according to the exemplary embodiment of the present disclosure.

Referring to FIG. 4, when the "speaking mode" starts, the processor 180 of the intelligent robot 100 may generate a response corresponding to user's voice data that is received.

In this case, the response may be generated on the basis of confidence information of a recognition result of the voice recognized in the "listening mode". In addition, the response is not limited to an answer according to the voice recognition result, but may be generated on the basis of additional information for deriving a result from a dialogue engine, the additional information including image information, situation information, etc., which are obtained through a camera.

In step S401, the intelligent robot may determine whether to "ask back" or not on the basis of confidence information and a voice recognition result recognized in the "listening mode".

According to the exemplary embodiment of the present disclosure, in step S402, when the voice recognition result and the confidence, which are based on the user's voice data, are determined to be normal on the basis of preset parameters, the intelligent robot may input the voice recognition result into the dialogue engine and generate an appropriate answer corresponding to the voice recognition result.

In contrast, in step S403, in a case where the confidence of the voice recognition result of the intelligent robot 100 is lower than a predetermined value or the voice recognition result corresponds to an operation unable to be performed by the intelligent robot 100, an asking-back answer such as "Could you say that again?" may be generated.

In step S405, the intelligent robot according to the exemplary embodiment of the present disclosure may generate a synthesized voice corresponding to the response on the basis of the answer generated by the operation in step S402 or S403, and may output the generated answer through the output unit.

Meanwhile, the generated answer may be output to a speaker through the synthesized sound, and several methods may be applicable such as to perform an operation of the intelligent robot in a case where the operation corresponding to the response exists, or display information corresponding to the answer on a screen through a display.

In step S407, once the outputting of the answer is completed, the intelligent robot may end playing the synthesized sound.

Hereinafter, the overall operation of the voice recognition device will be described on the basis of the listening mode and speaking mode.

Figure 5:
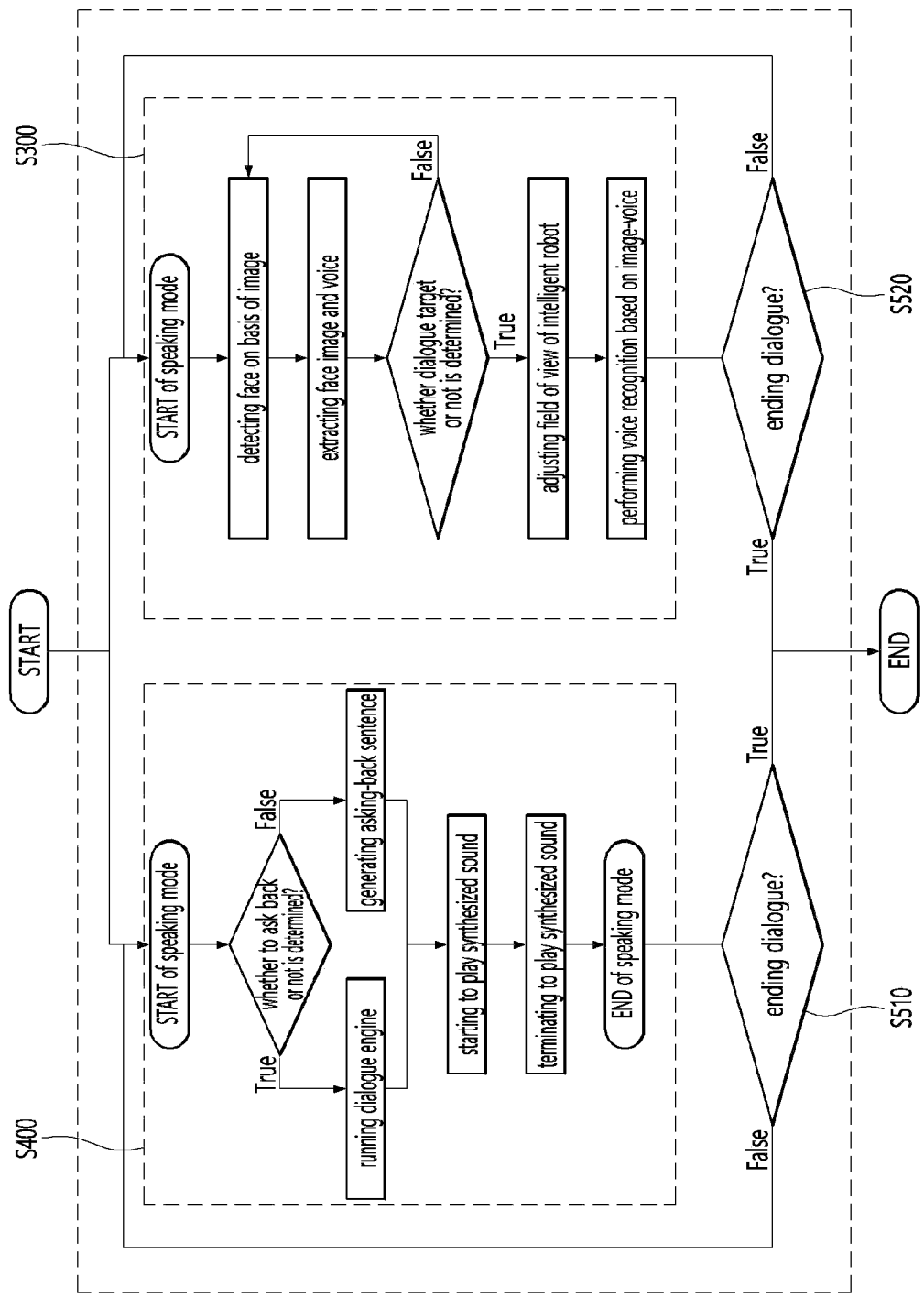
FIG. 5 is a view illustrating a flowchart of an overall operation according to the exemplary embodiment of the present disclosure.

FIG. 5 is a view illustrating the overall operation of the voice recognition device according to the exemplary embodiment of the present disclosure.

Referring to FIG. 5, with the start of intelligent robot's operations, the "speaking mode" and "listening mode" described in FIGS. 3 and 4 may be operated simultaneously.

As described above, the listening mode S300 may be activated at all times even while the speaking mode S400 is being performed, and through this way, the intelligent robot having the voice barge-in function may be provided.

In steps S510 and S520, the listening mode and speaking mode may be repeated until a dialogue between the user and the intelligent robot ends. In addition, voice recognition information obtained in the "listening mode" during the dialogue may be used as an input into the "speaking mode", and may be used to generate a synthetic sound or a response operation of the intelligent robot.

In the present disclosure, a range of information collection targets may be narrowed by utilizing image information within a range of vision of the robot along with voice information, and a robust result of barge-in detection and voice recognition may be obtained by recognizing solely a voice of an utterer present within the range of vision.

In addition, even though voice recognition fails, a starting point of the user's voice may be detected more accurately than conventional technologies, so "asking back" may be performed on the basis of confidence of the voice recognition result.

By using the present disclosure, in a situation of dialoguing with his or her intelligent robot, the user may naturally dialogue as if conversing with a person without being limited to a restricted scenario situation, thereby obtaining information conveniently.

Those skilled in the art of the present disclosure will understand that various illustrative logical blocks, modules, processors, means, circuits, and algorithm steps, which are described in connection with the exemplary embodiments disclosed herein, may be implemented by electronic hardware, various forms of programs or design code (referred to herein as software, for convenience), or a combination of all the hardware and software.

The above-described present disclosure may be implemented as computer-readable code in a medium on which a program is recorded. The computer-readable medium includes all types of recording devices in which data readable by a computer system is stored. Examples of the computer-readable medium include a Hard Disk Drive (HDD), a Solid State Disk (SSD), a Silicon Disk Drive (SDD), a ROM, a RAM, a CD-ROM, a magnetic tape, a floppy disk, an optical data storage device, etc.

What is claimed is:

1. An intelligent robot, comprising:
an input unit for receiving a user's voice data;
one or more processors; and
an output unit for outputting a response generated on a basis of the user's voice data,
wherein the processors generate the response corresponding to the users' voice data while maintaining a listening mode for identifying a dialogue partner by using the user's face image data and the user's voice data, and perform a speaking mode for control so as to perform an operation corresponding to the response,
wherein the processors detect the user's face within a range of vision by using surround image data obtained through the input unit, receive the voice data corresponding to the user's face, and identify the dialogue partner by using a learned artificial intelligence model to determine similarity between previously learned data and the user's face data and voice data, and
wherein the processors perform voice recognition by distinguishing the dialogue partner's voice data from surrounding noise or other users' utterance data.

2. The intelligent robot of claim 1, wherein the processors control a camera provided in the input unit when the dialogue partner's voice is detected and adjust a field of view input to the camera so as to center the dialogue partner's face.

3. The intelligent robot of claim 2, wherein the processors detect the user's face area from the user's pre-stored face data and image data input through the camera, and determine that adjusting the field of view of the intelligent robot is completed when the user's detected face area is positioned in a center of the field of view of the camera in a case where the similarity between the user's detected face area and the user's pre-stored face data exceeds a predetermined value.

4. The intelligent robot of claim 1, wherein the processors determine whether to ask back or not on a basis of a voice recognition result of the user's voice data, and the voice recognition result refers to voice recognition confidence of the user's voice data.

5. A method for operating an intelligent robot, the method comprising:

receiving a user's face image data and the user's voice data;

performing a listening mode for identifying a dialogue partner by using the user's face image data and the user's voice data;

generating a response corresponding to the user's voice data while maintaining the listening mode;

performing a speaking mode for control so as to perform an operation corresponding to the response;

using surround image data obtained through an input unit to detect the user's face within a range of vision and receiving the voice data corresponding to the user's face;

identifying the dialogue partner by using a learned artificial intelligence model to determine similarity between previously learned data and the user's face data and user's voice data; and performing voice recognition by distinguishing the dialogue partner's voice data from surrounding noise or other users' utterance data.

6. The method of claim 5, wherein the performing of the listening mode comprises:

controlling a camera provided in the input unit when the dialogue partner's voice is detected and adjusting a field of view input to the camera so as to center the dialogue partner's face.

7. The method of claim 6, wherein the performing of the listening mode comprises:

detecting the user's face area from the user's pre-stored face data and image data input through the camera and determining that adjusting the field of view of the intelligent robot is completed when the user's detected face area is positioned in a center of the field of view of the camera in a case where the similarity between the user's detected face area and the user's pre-stored face data exceeds a predetermined value.

8. The method of claim 5, wherein the performing of the speaking mode comprises determining whether to ask back or not on a basis of a voice recognition result of the user's voice data, and the voice recognition result refers to voice recognition confidence of the user's voice data.

* * * * *